US010607143B2

(12) United States Patent
Vijil et al.

(10) Patent No.: US 10,607,143 B2
(45) Date of Patent: Mar. 31, 2020

(54) PROFILE DATA CAMERA ADJUSTMENT

(71) Applicant: International Business Machines Corporation, Armonk, NY (US)

(72) Inventors: Enara C. Vijil, Millwood, NY (US); Seema Nagar, Bangalore (IN); Sudhanshu S. Singh, New Delhi (IN); Kuntal Dey, New Delhi (IN)

(73) Assignee: Internatonal Business Machines Corporation, Armonk, NY (US)

( * ) Notice: Subject to any disclaimer, the term of this patent is extended or adjusted under 35 U.S.C. 154(b) by 59 days.

(21) Appl. No.: 15/682,580

(22) Filed: Aug. 22, 2017

(65) Prior Publication Data

US 2019/0065966 A1 Feb. 28, 2019

(51) Int. Cl.
*G06N 5/04* (2006.01)
*G06Q 30/02* (2012.01)
(Continued)

(52) U.S. Cl.
CPC ............ *G06N 5/04* (2013.01); *G06N 20/00* (2019.01); *G06Q 10/103* (2013.01);
(Continued)

(58) Field of Classification Search
CPC ............ G03B 17/18; G03B 2205/0092; G06N 20/00; G06N 5/04; G06N 5/048; G06Q 30/02; G06Q 30/0631; G06Q 50/01; G06Q 10/10; H04N 5/2251; H04N 5/23212; H04N 5/23219; H04N 5/23229; H04N 5/23245; H04N 13/106; H04N 13/221; H04N 13/261; H04N 21/21805; H04N 21/4753; H04N 21/6587; H04N 7/18; H04N 7/181; H04N 7/186; H04N 5/23222; H04N 1/00323; H04N 2101/00; H04N 21/4223; H04N 2201/0084; H04N 7/183; B66B 13/26; G06T 2207/10016; G06T 2207/10032; G06T 7/269; G06T 7/593; G06T 2207/10024; G06T 2207/30201; G06T 7/70; G06T 7/80; G06T 7/73; G08B 13/19641; G08B 13/19656; G08B 13/19682; G08B 13/19689; G08B 13/19693; G08B 13/19695; G06F 3/005; G06F 3/015; G06F 3/0487; G09G 2380/16; G09G 3/003; A61B 5/7267;
(Continued)

(56) References Cited

U.S. PATENT DOCUMENTS 8,068,006 B2 * 11/2011 Martin ................ B66B 13/26
340/5.7
8,489,657 B2 7/2013 Shepherd et al.
(Continued)

FOREIGN PATENT DOCUMENTS

WO 2008076526 A1 6/2008

Primary Examiner — Aklilu K Woldemariam
(74) Attorney, Agent, or Firm — Nolan M. Lawrence

(57) ABSTRACT

Camera settings are managed. A candidate subject for capture by a camera is detected. The detection is based on historical profile data related to a user of the camera. One or more adjustments of the camera are identified for capture of the candidate subject. The one or more adjustments are identified based on the detected candidate subject. A proper capture action is performed based on the identified adjustments.

20 Claims, 4 Drawing Sheets

(51) Int. Cl.
   *G06Q 10/10* (2012.01)
   *G06N 20/00* (2019.01)
   *G06Q 50/00* (2012.01)
(52) U.S. Cl.
   CPC ......... *G06Q 30/0201* (2013.01); *G06Q 10/10* (2013.01); *G06Q 30/02* (2013.01); *G06Q 50/01* (2013.01)
(58) Field of Classification Search
   CPC .................. G06K 9/00288; H04W 4/21; A63B 2024/0028; Y10S 707/919; Y10S 707/92
   USPC ..... 382/118, 239; 345/7, 156, 173; 707/728, 707/792, 918, 919, 920
   See application file for complete search history.

(56) References Cited

U.S. PATENT DOCUMENTS

| | | | | |
|---|---|---|---|---|
| 8,605,955 | B2* | 12/2013 | Petrescu | G06K 9/00248 382/118 |
| 8,624,959 | B1* | 1/2014 | Houck, II | H04N 13/221 348/42 |
| 8,855,423 | B2 | 10/2014 | Boncyk et al. | |
| 8,897,541 | B2* | 11/2014 | Weisenburger | G01C 11/00 345/629 |
| 8,954,503 | B2 | 2/2015 | Bosworth et al. | |
| 9,141,191 | B2 | 9/2015 | Horowitz | |
| 9,245,231 | B2 | 1/2016 | Pinckney et al. | |
| 9,286,641 | B2 | 3/2016 | Bosworth et al. | |
| 9,347,783 | B2 | 5/2016 | Samuel | |
| 2003/0202101 | A1* | 10/2003 | Monroe | G08B 13/19689 348/156 |
| 2008/0051957 | A1* | 2/2008 | Breed | B60R 21/01552 701/36 |
| 2010/0036875 | A1 | 2/2010 | Miezianko et al. | |
| 2011/0320715 | A1 | 12/2011 | Ickman et al. | |
| 2013/0050507 | A1* | 2/2013 | Syed | H04N 1/00137 348/207.1 |
| 2013/0077835 | A1 | 3/2013 | Kritt et al. | |
| 2013/0201344 | A1 | 8/2013 | Sweet, III et al. | |
| 2014/0104453 | A1 | 4/2014 | Fujinawa et al. | |
| 2014/0223462 | A1* | 8/2014 | Aimone | A61B 5/0476 725/10 |
| 2015/0023602 | A1* | 1/2015 | Wnuk | G06K 9/00671 382/190 |
| 2015/0138427 | A1* | 5/2015 | Kennedy | H04N 5/23206 348/345 |
| 2015/0237268 | A1 | 8/2015 | Vaiaoga et al. | |
| 2016/0021293 | A1 | 1/2016 | Jensen et al. | |
| 2016/0044226 | A1* | 2/2016 | Williams | H04N 5/23206 348/211.3 |
| 2016/0055671 | A1* | 2/2016 | Menozzi | G06T 7/73 701/300 |
| 2016/0057457 | A1 | 2/2016 | Clements et al. | |
| 2016/0140934 | A1* | 5/2016 | Frieder | H04W 4/21 345/156 |
| 2016/0173631 | A1* | 6/2016 | McKay | H04L 67/22 709/203 |
| 2016/0182801 | A1* | 6/2016 | Luk | H04N 5/23206 348/207.11 |
| 2017/0227162 | A1* | 8/2017 | Saika | H04N 5/2328 |
| 2017/0257553 | A1* | 9/2017 | Lachapelle | H04N 7/15 |
| 2018/0063411 | A1* | 3/2018 | Rivard | H04N 5/2258 |
| 2018/0278887 | A1* | 9/2018 | Bostick | H04N 7/147 |

* cited by examiner

PROFILE DATA CAMERA ADJUSTMENT

BACKGROUND

The present disclosure relates to camera capture technology, and more specifically, to using profile data to improve the quantity and quality of image captures.

Cameras may be used by marketing and commercial enterprises, such as producing brochures or advertising materials. Cameras may be used for therapeutic purposes, such as to document certain medical conditions. Cameras may be used for law enforcement purposes, to record the events surrounding an investigation. Cameras may be used for recreational purposes, such as capturing and preserving memories and interactions between close friends and family.

SUMMARY

According to embodiments of the present disclosure, disclosed herein are embodiments of a method, a system, and a computer program product of managing camera settings. A candidate subject for capture by a camera is detected. The detection is based on historical profile data related to a user of the camera. One or more adjustments of the camera are identified for capture of the candidate subject. The one or more adjustments are identified based on the detected candidate subject. A proper capture action is performed based on the identified adjustments.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

The present disclosure relates to camera capture technology, and more specifically, to using profile data to improve the quantity and quality of image captures.

Figure 1:
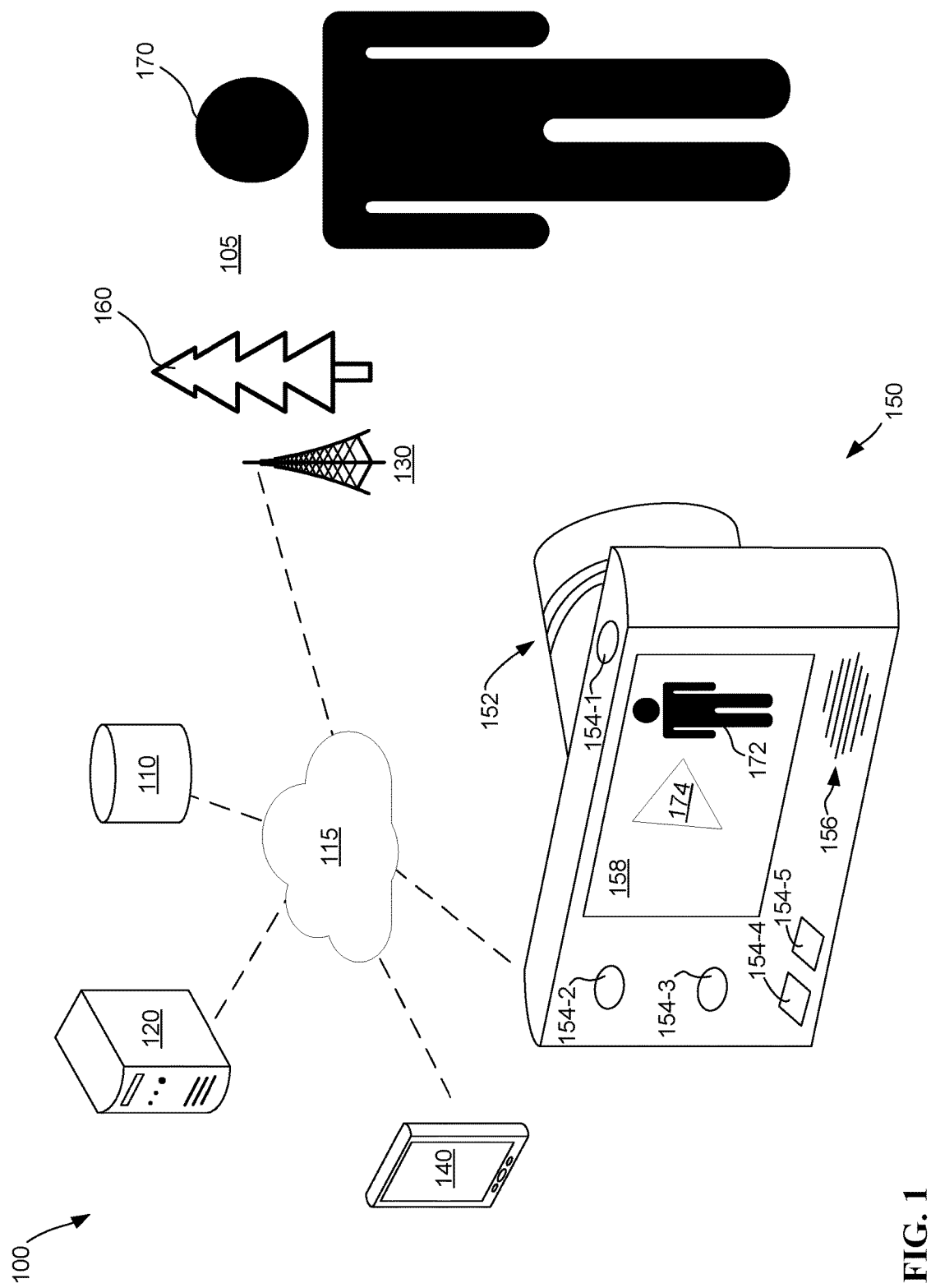
FIG. 1 depicts an example environment with a camera adjustment system based on profile data, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to camera capture technology, more particular aspects relate to using profile data to improve the quantity and quality of image captures. While the present disclosure is not necessarily limited to such applications, various aspects of the disclosure may be appreciated through a discussion of various examples using this context.

Camera technology is constantly changing and the camera has seen many variations from its inception. Original cameras were large and clunky, and took photographs (alternatively, photos) slowly and in a time consuming manner. These photos were recorded onto a photographic plate or film. Consequently, original cameras were used for the capture of very still subjects (e.g., plants or landscapes) or very important people in staged shots (e.g., where every subject in the shot had to be very still for an extended period of time). Later, cameras developed further refinements and complexity. Some camera optics (e.g., lenses) are made from high quality and expensive materials, such as glass or sapphire. Some cameras utilize a plurality of lenses to improve the quality of the taken pictures, further increasing the cost and size of cameras. Additionally, some cameras include other advanced small-scale electronic or electromechanical devices that add additional cost (e.g., single-lens reflex mirror and prism systems, advanced microprocessors, CCD or CMOS sensors, etc.).

More recently, sharp increases in camera usage for image capture (e.g., photos and videos) have occurred in some cases. Cameras have become ubiquitous enough that many users now have multiple cameras throughout their lives (e.g., smart phone cameras, more expensive mirrorless digital cameras, automobile dashboard cameras, wearable cameras, etc.). Often, trends in camera ubiquity have led to increased photography frequency. Photography concepts and camera uses once thought impractical are now commonplace. In some cases, many users may take photos weekly or daily to capture photos not just for commercial purposes but also leisure activities and travel.

Additionally, the advent of ubiquitous computing and the connectivity provided by the Internet have complicated and increased the usage of cameras. Social networks have become increasingly popular; users connect online (e.g., through the Internet) to share experiences. Social networking portals are often geared towards posting and sharing more images. Often, real-time events form online—these events encourage users to post dozens or hundreds of photos and in some cases live streaming video. Consequently, smartphones which provide constant Internet connectivity have also provided users with increased camera capabilities. Usage and quantity of photography continues to increase—often, infrequent photo creation has become hourly or minute-by-minute photo creation.

While the quantity of photos has increased, so has the quality demands of camera users. In some cases, the market prefers cameras to perform image capture with improved optical precision. For example, rapid production of a quality picture that has aesthetically pleasing scene composition, is properly zoomed, and in focus has high desirability. Average users want to create and share great looking photos for social networks. Professional photographers desire to capture high quality photos of increasingly varied subjects for commercial purposes. Each of these higher quality images require greater storage to hold on cameras or to transmit online.

In some cases, to create higher quality photos and with higher frequency advanced processing has to be used. The advanced processing from processing units detect features in a viewfinder when a user intends on taking a picture of subject. In some cases, a person may intend to take a picture of a family member, and they will point the camera at the family member. The advanced processing created by the central processing unit may assist with the focus and zoom of the image. In this way existing cameras can determine from a presented scene elements that may be desirable to be captured.

Unfortunately as camera use and demands continue to increase, it may be difficult to capture (alternatively, photograph) certain subjects with a camera. It may be difficult to capture certain subjects because they may be fast moving. The fast moving elements may include fauna, such as small mammals or insects. The fast moving elements may also include babies or small children interacting with the world. The fast moving elements may also include people that play sports. It may also be difficult to capture certain subjects as they may be rare occurrences. The rare occurrences may include a fleeting scene in nature, or a special moment of a family member or friend. It remains a technical challenge to adjust the variety of sensors and optics rapidly and effectively when presented with a desirable subject to capture.

A camera adjustment system (CAS) may overcome the technical challenges related to capturing images timely and accurately. In some embodiments, the CAS may capture images that were previously unable to be captured. The CAS may capture images based on profile data related to the user. The profile data may be historical in nature, such as previous content or analysis that was performed before the opportunity to capture the candidate subject was available. For example, before a pet enters a room containing a camera configured with the CAS, the camera may be aware of and determine the features of the pet from previous photos stored on the camera. A camera that includes a CAS may be of reduced size, weight, or complexity compared to other cameras. For example, the CAS may require reduced processing or battery utilized for real-time optical and capture setting adjustments compared to other cameras. A camera including a CAS may require reduced memory, as the quality of images captured may be increased sufficiently to require fewer image captures to obtain a photo of a candidate subject worth keeping.

The profiled data utilized by the CAS may include social media data of the user. The CAS may capture images based on profile data of other users. The CAS may modify or adjust the zoom, focus, or other settings of the camera before a subject is detected by a user of the camera. The CAS may operate based on images previously captured by the camera or other cameras. In some embodiments, the CAS may operate based on the content of previously captured images. In some embodiments, the CAS may operate based on the metadata of previously captured images.

FIG. 1 depicts a camera adjustment system 100 (CAS) based on historical profile data, in accordance with embodiments of the present disclosure. The CAS 100 may operate in a real-world environment 105. The CAS 100 may include a datastore 110, one or more servers 120, one or more internet of things (IoT) devices 130, one or more smart devices 140, and a capture camera 150. The elements of the CAS 100 may be communicatively coupled together by a network 115. In some embodiments, the CAS 100 may be entirely integrated within a single devices (e.g., the capture camera 150). The real-world environment 105 may be indoors, such as a child's birthday party inside of a home. The real-world environment 105 may be outdoors, such as a nature stop during a family vacation.

The datastore 110 may be one or more file systems or databases configured to store records related to the CAS 100. The datastore may also include one or more processors configured to receive and respond to data access requests by the servers 120, the smart devices 140, and the capture camera 150. The datastore may operate as a database server, and may run one or more relational database systems that receive and execute queries (e.g., SQL database server). The CAS 100 may generate and store data records about subjects and existing images, as well as identified candidate subjects and ranking data to ascertain the relevance of a candidate subject. The CAS 100 may also receive updated rankings from the servers 120, smart devices, and/or capture camera 150.

The network 115 may include one or more hardware devices for communicatively coupling the various elements of the CAS 100 (e.g., routers, hubs, switches, etc.). The network 115 may be a local area network that operates through networking wires and with a network protocol (e.g. Ethernet). The network 115 may be a network that operates without wires using a wireless protocol (e.g., a WiFi network utilizing the IEEE 802.11 WLAN standard). The network 115 may communicatively couple the CAS 100 to a larger network that contains a social media presence of the user (e.g., the Internet). The network 115 may be a short-range personal network designed to permit communication between the various devices of the CAS 100 (e.g., a Bluetooth network, a wireless PAN, etc.). The network 115 may include a cellular network that operates from a plurality of cellular antennas (not depicted) located throughout the real-world environment 105. In some embodiments, the network 115, may be a heterogeneous network that simultaneously utilizes multiple types of networking protocols. For example, the smart devices 140 may utilize a personal area network to communicate with each other and with the capture camera 150, while also using a cellular network to communicate with the one or more servers 120 and the data store 110.

The servers 120 may include one or more processors and memory coupled to input/output. An example of a server that may be consistent with embodiments of the disclosure is described in FIG. 4. The servers 120 may perform analysis of historical photo data and determine candidate subjects for future photo capture. The servers 120 may perform analysis of historical profile data by ranking potential candidate subjects. For example, a user may take pictures of a variety of subjects and the subjects may be stored on the server 120. The server 120 may use one or more algorithms or techniques specific to photo analysis to detect candidate subjects (e.g., feature detection, neural networks, deep learning, etc.).

The servers 120 may retrieve historical profile data related to a user of a given camera. For example, the servers 120 may monitor profile information through the network 115 related to a social media profile of the user and may detect or determine interests or hobbies or photos related to the user. Continuing the example, the servers 120 may scan the photos metadata to determine information about the type of photos including places of interest. The metadata of photos may include one or more attributes not within the rendered image of the photo (e.g., EXIF, ICC, XMP, etc.). The servers 120 may utilize one or more techniques to detect candidate subjects based on the historical profile data, such as natural language processing.

The IoT devices 130 may include a plurality of network-connected devices that communicate with each other and other devices of the CAS 100. The IoT devices 130 may be placed in the real-world environment 105. The IoT devices 130 may each include a memory module and a transceiver. A given IoT device 130 may include further components such as sensors to detect/derive information from the real-world environment 105 or the other components of the CAS 100. A given IoT device 130 may also include a power source (e.g., a battery) to power the components of the IoT device. The memory of a given IoT device 130 may be a non-volatile memory (e.g., flash memory) such that information stored on the IoT device may be retained in the advent that power is not continuously provided to the IoT device. In some embodiments, the IoT devices 130 may obtain power from the capture camera 150 or the smart devices 140. For example, a given IoT device 130 may include an RFID tag that is receptive to power from radio waves emitted by the capture camera 150. Continuing the example, when the capture camera 150 is within twenty-three feet the IoT device 130, the IoT device may be powered by the capture camera. Upon being powered, the IoT device 130 may transmit information about nearby candidate subjects to the capture camera 150.

The IoT devices 130 may contain within the memory information about the candidate subject to be photographed by the capture camera 150. The IoT devices 130 may also be configured with information regarding capture settings for the capture camera 150. For example and as depicted in FIG. 1, a first IoT device 130 may be a powered antenna that is placed next to a first subject 160 in the real-world environment 105. The first IoT device 130 may include information about the first subject 160. For example, the first subject may be a tree and the information stored in the first IoT device includes the values "Douglas-fir tree", "43 years old", and "flora adult." The first IoT device 130 may include information about the recommended camera settings to ideally capture the subject, such as the zoom and focus settings of the capture camera 150. The first IoT device 130 may include information about the placement of the capture camera 150 in relation to the first IoT device 130. For example, the latitude, the longitude, the elevation, and the direction of the capture camera 150 to capture the first subject.

The IoT device 130 may operate in software architecture that utilizes publish and subscription (pub-sub) methodologies. The IoT device 130 may operate a pub-sub methodology by coordinating with and utilizing the processing power of the servers 120. The pub-sub methodology may operate through a messaging middleware system that categories publishes messages into classes without regard to various subscribers. Further, subscribers may subscribe to a specific class of messages and receive only a subset of message—those messages of a subscribed class. The subset may be topic-based, and the publisher may determine to filter the content of the messages for all publishers into topics and all subscribers would subscribe to certain topics, and each subscriber would receive the same messages in a given topic. The subset may be content-based, and the publishing may be based on pre-set attributes and, consequently, the subscriber would have to classify the messages.

The smart devices 140 may be smartphones, tablets, or other personal digital assistants carried by users. Each smart device 140 may include a memory and process, and a sensor configured to detect candidate subjects for capture by the camera. The sensor of the smart device may be an optical sensor, such as a camera. The sensor may be a location sensor, such as a global position sensor (GPS). The sensor may be an elevation sensor, such as an altimeter. In some embodiments, the sensor may be a plurality of sensors. Each smart device 140 may detect the candidate subject based on a ranking generated by the smart device or another component of the CAS 100, such as the servers 120, or the capture camera 150. The smart devices 140 may be standalone devices, for example a smart phone of a user. In some embodiments, the smart devices 140 may be embedded in one or more devices in possession or control of the users.

For example, a smart device 140 may be embedded in a vehicle having various cameras and sensors for safety and advanced pedestrian detection and avoidance. The camera of a vehicle may be directed down a roadway and the vehicle may utilize the camera to detect objects and obstructions in the roadway. The camera of the vehicle may also capture images and an onboard processor configured in accordance with the CAS 100 may perform analysis of the images captured by the vehicle camera. The vehicle may detect, based upon the performed analysis a candidate subject (e.g., a small mammal). The vehicle may transmit via the network 115 one or more indicators to the capture camera 150 regarding the candidate subject. The vehicle may additionally perform an alert (e.g., sounding an alarm, displaying a notification on the instrument panel)—the alert indicating that a candidate subject is found and the user should safely pull over. The indicators may include instructions to direct the user towards the candidate subject. The indicators may be displayed directly by the vehicle, or by the capture camera 150.

The capture camera 150 of the CAS 100 may detect one or more candidate subjects and may perform one or more capture actions. The capture camera 150 may include a lens 152; a plurality of buttons 154-1, 154-2, 154-3, 154-4, and 154-5 (collectively, 154); a speaker 156; and a display 158. The capture camera 150 may also include other components not depicted, such as a network antenna for communication with the network 115, an orientation sensor for determining position of and tracking movement, and a GPS for tracking location of the capture camera. The capture camera 150 may include one or more sensors and one or more optics for varying usable exposure or capture of a subject. The sensors and optics may be related to various camera properties (e.g., aperture, autofocus point, capture resolution, exposure index rating (ISO), film speed, focus, focal length, metering, shutter speed, white balance, zoom, etc.). One or more adjustments may be made to the capture camera 150 to alter the various camera properties through manipulation of the sensors and optics. For example, the sensors and optics may be adjusted for exposure or focus of the capture camera 150.

The lens 152 of the capture camera 150 may be adjustable by a user or by the capture camera. The lens 152 may be adjusted automatically by the capture camera 150 based on a candidate subject being detected. The lens 152 may allow adjustment of the one or more camera properties. For example, the lens 152 may allow adjustment of the focal length (e.g., an adjustable focal length lens may zoom from a 10 mm focal length to 45 mm focal length). The lens 152 may be a fixed focal length, such as a 17 mm focal length. The lens 152 may be detachable from the capture camera 152 and may include one or more components (e.g., integrated circuits) that when coupled to the capture camera broadcast details about the lens. For example, a first lens 152 is connected to the capture camera 150 and broadcasts that it is a 90 mm fixed focal length lens. The adjustment of camera properties may be the capture camera 150 suggesting a lens change from the current lens 152 to another lens.

The plurality of buttons 154 may allow adjustment of the one or more camera properties and enable capture of a subject. Button 154-1 of the plurality of buttons 154 may direct the capture camera 150 to capture a subject. Buttons 154-2 and 154-3 of the plurality of buttons 154 may cycle through various adjustment settings, such as switching between adjustments of shutter speed, ISO, white balance, and metering. Buttons 154-4 and 154-5 of the plurality of buttons 154 may adjust the setting of a specific camera property. For example, button 154-4 may increase shutter speed and button 154-5 may decrease shutter speed. In some embodiments, the plurality of buttons 154 may be configured differently. For example, button 154-4 may select between adjustments and button 154-5 may adjust a selected adjustment. In some embodiments, one or more of the plurality of buttons 154 may be configured to review historical profile data. For example, the historical profile data may be previously capture photographs and videos and button 154-2 may cycle between previous captures. The buttons 154 may be adjusted based on a candidate subject being detected.

The capture camera 150 may also include one or more processors and memory to perform analysis of historical profile data and detect candidate subjects for photo capture. The capture camera 150 may perform analysis of historical profile data by ranking potential candidate subjects. For example, a user may take pictures of a variety of subjects and the subjects may be stored on the capture camera 150. The capture camera 150 may use one or more algorithms or techniques specific to photo analysis to detect candidate subjects (e.g., feature detection, neural networks, deep learning, etc.).

The capture camera 150 may retrieve historical profile data related to a user of the capture camera. For example, the capture camera 150 may monitor profile information through the network 115 related to a social media profile of the user and may detect or determine interests or hobbies or photos related to the user. Continuing the example, the capture camera 150 may scan the metadata of the photos to determine information about the photos including places of interest. The metadata of photos may include one or more attributes not within the rendered image of the photo (e.g., EXIF, ICC, XMP, etc.). The capture camera 150 may utilize one or more techniques to detect candidate subjects based on the historical profile data, such as natural language processing.

The capture camera 150 may detect a candidate subject from historical profile data by automatically acquiring and scanning previously taken photos. Specifically, and by way of example, the capture camera 150 may periodically capture images without interaction from a user. The capture camera 150 may operate at a variable period, such as capturing an image every five seconds, or every ten minutes. The capture camera 150 may cache the automatically acquired images for a length of time, such as one hour or thirty six hours; after the length of time the cached automatically acquired images may be automatically deleted from the capture camera. The capture camera 150 may hide the automatically acquired photos from the user (e.g., storing the captured photos in a system read-only folder of the memory of the capture camera). The capture camera 150 may use images processing techniques to identify candidate subjects in the automatically acquired photos.

The capture camera 150 may detect a candidate subject from one of the other components of the CAS 100. In a first example, the capture camera 150 may receive a communication from the smart device 140, and based on the GPS of the smart device, indicative that the capture camera is near a potential candidate subject. In a second example, the capture camera 150 may receive a communication from the IoT device 130 that the capture camera is near a potential candidate subject. In some embodiments, a combination of CAS 100 components may detect a candidate subject. In a third example, the capture camera 150 may receive from the servers 120 an updated ranking of candidate subjects and the capture camera may detect a candidate subject from the updated ranking from automatically acquired and scanned images.

The capture camera 150 may identify capture actions to take based on the detection of a candidate subject. The capture actions may be identified from a series of entries in the memory of the capture camera 150. The capture actions may include adjustments to the camera properties. For example, based on a detected out of focus candidate subject being present in the area, calculation the change of the focus camera property. The capture actions may include notifications to the user regarding adjustments to the orientation of the camera. In a first example, based on a detected candidate subject not being centered, calculating a change in orientation to center the candidate subject. In a second example, based on a detected candidate subject no longer being in view of the capture camera 150, calculating a change in orientation to place the candidate subject in view.

In some embodiments, the capture camera 150 may identify one or more capture actions and may make one or more adjustments to the camera properties based on the camera resources of the capture camera 150. The camera resources of the capture camera 150 may include the storage space of the capture camera. For example, the storage space of the capture camera 150 may be in a low status, such as only having 10% storage space left or having only twenty-two megabytes of storage space. Continuing the example, based on the low status of the storage space the capture actions may include altering the automatically acquired images by reducing the stored resolution of the automatically acquired images, reducing the frequency of automatically acquiring images, by reducing the amount of stored automatically acquired images, or a combination thereof. The camera resources of the capture camera 150 may include the power-level of a power-source of the capture camera. For example, the power-source of the capture c camera 150 is a battery and the battery is currently at a 38% charge. Continuing the example, the charge of the battery reaches 33% charge and responsively the capture camera 150 reduces the number of adjustments to be made to perform the capture action. The decision to reduce the number of adjustments may be based on the processing load to perform the adjustments. For example, capture actions that are based on scanning plain text metadata may be less processing intensive than feature detection of actual images—reducing in adjustments may be to only perform the less processing intensive scanning of metadata.

The proper capture action to perform may be situational and may be based on the candidate subject. The capture actions may be in the form of notifications to the user, such as visual or audible alerts. The capture actions may be in the form of actual actions, such as adjustments to be performed by the capture camera 150. In a first example, the capture camera 150 may adjust the zoom of the lens 152 automatically, after identifying that the lens is zoomed too close to capture the first subject 160 (i.e., the Douglas-fir). In a second example, the capture camera 150 may adjust the shutter speed automatically, when the candidate subject is quickly moving reptile. In a third example, the capture camera 150 may perform the capture of the subject (e.g., by actuating the circuit under button 154-1) automatically.

The speaker 156 of the capture camera 150 may be utilized to perform the capture actions. The speaker 156 may play a sound such as a simulated alarm bell at the instruction of the processor from a sound file stored in memory of the capture camera 150. The speaker 156 may play a sound such as a prerecorded human voice and the voice may contain instructions for a user to operate the camera. For example, the voice may state "rotate camera ninety degrees" to instruct the user to capture a portrait photo of a candidate subject.

The display 158 of the capture camera 150 may be utilized to perform the capture actions. For example, second subject 170 may be a human that is highly ranked by the CAS 100. The second subject 170 may be highly ranked because the capture camera 150 has detected many photos of the subject already present (e.g., on the capture camera or the smart device 140). The display 158 may operate by showing an unaltered or unagumented view of the real-world environment 105. The display 158 may perform a capture action by altering the view of the real-world environment 105 by emphasizing the second subject 170 but by not showing the first subject 160. The display 158 may perform a capture action by altering the view of the real-world environment 105 by generating a rendering 172 of the second subject 170—the rendering 172 may be animated such as by being shaded, enlarged, or flashing. The display 158 may perform a capture action by augmenting the view of the real-world environment 105 by generating and overlaying an indicator 174. The indicator 174 may further emphasize the second subject 170. The indicator 174 may be a direction or arrow that the capture camera 150 may be moved to center the second subject 170.

The orientation sensor of the capture camera 150 may be utilized to detect candidate subjects, and the identification and performance of capture actions. The orientation sensor may be a sensor designed to detect position of the capture camera (e.g., a gyroscope, magnetometer, one or more accelerometers, etc.). The orientation sensor may be a sensor designed to detect relative position with respect to the ground. The orientation sensor may operate by automatically determining the orientation of the capture camera 150 in relative space (e.g., in relation to the earth). The orientation sensor may include one or more ferrous materials. The orientation sensor may include one or more other sensors, such as a barometer to detect height and other attributes about the capture camera 150 relative position in relation to the real world (e.g., the real-world environment 105). The processor and memory of the capture camera 150 may operate to record, store, and compare the readings of the orientation sensor.

The capture camera 150 may integrate the orientation sensor recordings with periodic automatically acquired images. For example, every twelve seconds the capture camera 150 may automatically take a picture and record into the picture metadata about the orientation of the capture camera from the orientation sensor. While the capture camera 150 is moving through space, the path and movement of the camera in the real world 105 is being determined by the processor and based on the orientation sensor recordings. The capture camera 150 may detect the first subject 160 to determine that the first subject is a candidate to be captured by the camera. The capture camera 150 may utilize the orientation sensor recordings to determine the orientation of the camera since the last automatically acquired image (e.g., using image analysis techniques). The capture camera 150 may utilize the image analysis and compare the orientation of the capture camera at the time the periodic automatically acquired image was taken to the present orientation of the capture camera. The processor of the capture camera 150 may utilize the image analysis to identify one or more adjustments to make for capture of the candidate subject.

The proper capture action may include adjustments to be made automatically or notifications for adjustments to be made by the user of the capture camera 150. In a first example, the proper capture action may be to adjust the zoom of the lens 152 based on identifying the subject 160 is too far. In a second example, the proper capture action may be to generate a notification to the user regarding adjustment of the ISO of the capture camera 150 (e.g., by playing a sound file regarding the ISO to the speaker 156, by rending text regarding the ISO to the display 156, etc.). In a third example, the proper capture action may be to perform the capture of the image automatically (e.g., without user actuating or touching button 154-1). In a fourth example, the proper capture action may be to inform the user to adjust the capture camera 150 by directing the orientation and position of the capture camera. Continue the fourth example, the proper capture action may be a series of directions provided to the user to back track the movement of the camera along a path through the real-world environment 105 to position the capture camera 150 to capture the subject 170. The proper capture action may include an update to the profile history of the user. For example, by updating a count of the number of times a specific subject was photographed.

Figure 2:
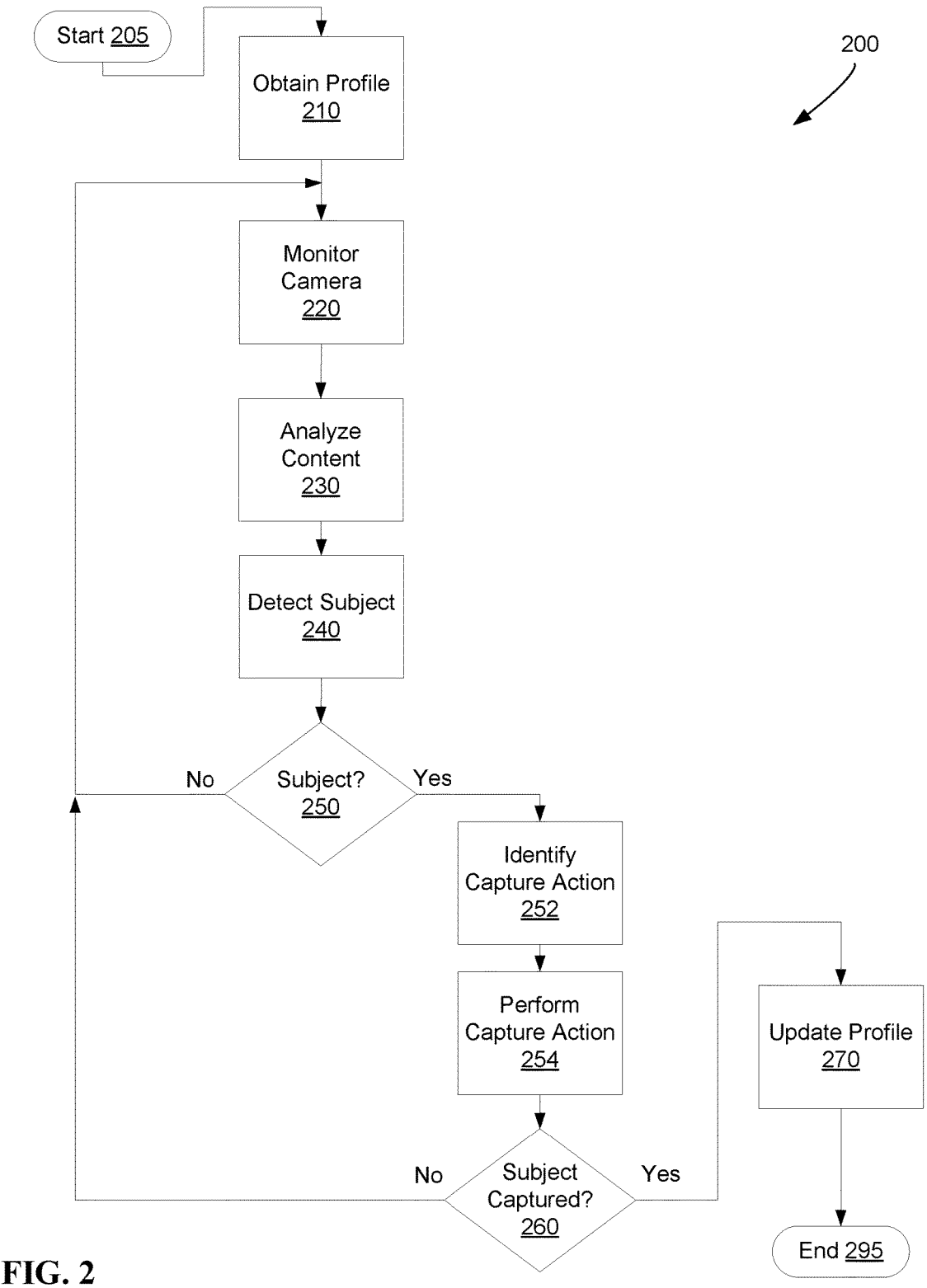
FIG. 2 depicts an example flow diagram of a method for adjusting camera settings, in accordance with embodiments of the present disclosure.

FIG. 2 depicts an example flow diagram of a method 200 for adjusting camera settings, in accordance with embodiments of the present disclosure. Method 200 may be performed by a capture camera in accordance with embodiments of the present disclosure. Method 200 may be performed by a plurality of components of a capture system in accordance with embodiments of the present disclosure. For example, some operations may be performed by one or more servers communicatively coupled to a camera through a network while other operations may be performed by the camera itself. In some embodiments, method 200 may be performed entirely by a camera, such as the capture camera of FIG. 1. Method 200 may include more or less operations than those depicted and some of depicted and some operations may be combined or separated. One or more operations of method 200 may be executed continuously, or repeated periodically (e.g., every sixteen milliseconds, every ten milliseconds, etc.).

From start 205, profile data related to a user of a camera may be obtained at 210. The profile data may include historical information (e.g., historical profile data). The profile data may be obtained at 210 locally from a long-term storage device of a camera, such as a secure digital card. The profile data may be obtained at 210 by a given camera from a secondary server through a network of the camera. The profile data may be obtained at 210 by being sent from another device and obtaining the data may include listening through a network for the profile data.

The profile data obtained at 210 may include information about the user of a camera, such as a username and demographic information like age. The profile data may include information about the historical photographic data of a user. The historical photographic data of a user may include previous photos captured by the user. The photos may be stored locally on a camera or may be stored remotely on one or more servers. The historical photographic data may be data captured ty a camera executing method 200. In some embodiments, the historical photographic data may be data captured by a camera other than a camera executing method 200. The historical photographic data of the user may include metadata regarding the photos captured by a user, such as EXIF data. The historical photographic data may include information determined by performing one or more feature or subject analysis algorithms (e.g., edge detection, face detection, etc.) on captured photos.

The profile data obtained at 210 may include information about the habits and online behavior of a user, historical social data. The historical social data may be based on the action of a user, such as friending another online user. The historical social data may be based on an online profile of a user, such as cumulative usage of likes or dislikes of certain content or the amount of posts on content. The historical social data may be based on the existence of or membership in certain clubs that are affiliated to the user. For example, a given user may be a member of a club titled "Squirrels at Sunset" on a social networking portal online. Continuing the example, the profile data may include historical social data that includes keywords that are discovered through natural language processing such as "squirrel" and "sunset."

The profile data obtained at 210 may also include a list of potential candidate subjects. The list of potential candidate subjects may be ranked in order from most to least desirable for capture. The list of potential candidate subjects may also include one or more potential adjustments to be made for capture of new images. For example, a first ranking may be received with a first value of "1" for a ranking attribute, a second value of "portrait of close friend" for a subject attribute, and a third value of "2.8" for an f-stop attribute. In a second example, a second ranking may be received with a first value of "2" for a ranking attribute, a second value of "action sport" for a subject attribute, a third value of "1/2000" seconds for a shutter speed attribute, and a fourth value of "160" for a metering mode attribute.

At 220 a camera signal of a camera may be monitored for potential candidate subjects. The camera signal may be monitored at 220 by polling one or more sensors of the camera, such as monitoring the raw signal from the sensor of the camera. The camera may be placed into a continuous capture mode to monitor the camera signal at 220. The continuous capture mode may operate by taking a picture every few seconds, such as every ten seconds. The camera signal may be monitored at 220 by recording into a cache of a camera. For example, the camera signal may be recorded out to a JPEG image format and may be recorded along with EXIF data into a portion of memory of the camera. Continuing the example, the captured camera signal may be preserved for a predetermined period of time (e.g., four hours) or until analysis of the image is performed.

The content of the camera may be analyzed at 230. The content may be analyzed at 230 by comparing the camera signal captured at 220 with the profile data obtained at 210. The content of the camera may be analyzed at 230 by matching features or subjects through a feature detection algorithm (e.g., edge detection through a neural network). The content of the camera may be analyzed at 230 by comparing additional information from the monitored camera signal at 220. For example, metadata related to the type of capture from the monitored camera signal at 220 may be compared to metadata of previously taken photos from the obtained profile data at 210.

A candidate subject to be captured by a camera may be detected at 240. The candidate subject may be detected at 240 based on the analysis of content at 230. The candidate subject may be detected at 240 by an IoT device providing information about the environment of the camera. For example, a candidate subject may be detected by receiving an IoT beacon that broadcasts that a certain type of flower is near. Continuing the example, a camera operating under method 200 may receive the broadcast from the IoT beacon and may detect that the flower is a subject desirable to capture by the user of the camera. The candidate subject may be detected at 240 based on a subject being present in a first image but not a second image of the monitored camera at 220. For example, a camera may be set up in a living room on a tripod during a birthday party. The camera may detect that a first child at the birthday party is a candidate subject at 240. The detection at 240 of the child at the birthday party may be based on analysis at 230 that the child is a child of an owner of the camera. In some embodiments, multiple candidate subjects may be detected at 240. For example, a Warmblood Cross horse is detected at sunset and both of those subjects are desirable to be captured.

If a candidate subject is detected at 250, then one or more capture actions may be identified at 252. If a candidate subject is not detected at 250, then the camera may continue to be monitored at 220 for potential candidate subjects. The identified capture actions at 252 may be related to the content of a given candidate subject, such as an evening time of day yields a higher ISO setting. The capture actions may be identified at 252 based on a set of pre-existing rules of a given camera, such as rules stored in the camera. The identified capture actions at 252 may be related to the content or metadata of historical profile data obtained at 210, such as an ISO setting of a first subject in a previously taken photograph. The identified capture actions at 252 may be based on the analysis of content at 230, such as a fast moving animal consequently requires a faster shutter speed setting should be set. The identified capture action at 252 may include a notification, such as a text or audible alert. The text or audible alert may be designed to be presented to a user of a given camera operating consistent with method 200. For example, a textual alert may say "decrease f-stop to 1.8 obtain a bigger depth of field." The identified capture action at 252 may include a visual notification, such as graphics or indicators. The graphics or indicators may be related to the settings for a given camera, such as "increase ISO to 800." The graphics or indicators may be related to the candidate subject to be captured, such as an arrow indicating the direction the camera should be oriented to obtain a picture.

The identified capture actions at 252 may be performed at 254. Performance of the capture action at 254 may include displaying text on a screen of a camera, or playing sounds through a speaker of the camera. The displaying of text or playing of sounds may direct a user of the camera. This directing of the user may assist the user in obtaining a better photograph. In some embodiments, performance of the capture action at 254 may include the camera automatically performing the capture action. For example, the proper capture action may be adjusting the zoom of a lens to 35 mm focal length to capture a wide shot of nature. Continuing the example, the adjustment may be performed at 254 in response to a camera being at a certain GPS coordinates and the adjustment of the lens to 35 mm focal length may be performed before the camera is pointed at the subject. In some embodiments, performing the capture action may be to perform the capture of the subject automatically. In some embodiments, multiple capture actions may be identified as necessary at 252 and performing a proper capture action at 254 may be the performance of multiple capture actions.

If a subject is not captured at 260, then a camera signal of a camera may continue to be monitored for potential candidate subjects at 220. A subject may be captured at 260 based on a user of the camera performing the capture of the subject. A subject may be captured at 260 based on a capture action being performed at 254. If a subject is captured at 260, then profile data related to the user or the camera may be updated at 270. The update of the profile data at 270 may include generating metadata related to the photo. The update of the profile data at 270 may include transmitting by a network the photo to a server or other secondary device. After the profile data is updated at 270, method 200 ends at 295.

In a first example of method 200, profile data obtained at 210 may include photographs of a child, and these historical photographs may have one or more common traits such as EXIF data that indicates a fast 1/800 shutter speed. The common traits may be determined based on analysis of the historical photographs at 230. The camera may be monitored at 220 and through the analysis at 230 the camera may sense the child is detected at a birthday party at 240 as a candidate subject. Additionally and based on content analysis at 230, the camera may through orientation sensors and based on monitoring the lack of button presses determine that it is not being held or interacted with by a user, such as sitting on a table or mounted to a tripod. Based on the content analysis at 230 and the detected subject at 240, the camera may identify a proper capture action may include adjusting the shutter speed to 1/800 and performing capture of the subject. At 254, the camera may adjust the shutter speed to 1/800 and capture the image. The camera may determine, based on the photograph being taken at 254 that the child subject was successfully captured at 260; the profile of the user of the camera may be updated at 270 with the newly taken photo of the child.

In a second example of method 200, profile data obtained at 210 may include photographs of animals, specifically parrots. The profile data may also include a ranking that parrots are a top subject to be captured. The profile data related to the parrots may also contain camera attributes that are related to the subject, such as ISO 400 to 900, aperture f-stop 5 to 16, and shutter speed 1/500 s to 1/1000 s. The profile data obtained at 210 may also include information about a specific setting, specifically sunsets, and a ranking that sunsets are a top subject to be captured. The profile data related to sunsets may also contain camera attributes that are related to the subject, such as ISO 100 to 500, aperture f-stop 8 to 22, and shutter speed 1/800 s to 1/1,500 s.

Continuing the second example, the camera may be monitored at 220 by receiving sensor data from the camera every ten seconds. The camera may also be monitored at 220 by reading timestamps from an internal clock of the camera. The content of the monitored camera may be analyzed at 230 (e.g., by comparing the content to the profile data related to parrots and sunsets at 210). Based on the analysis, at 230, the timestamps may determine that it is 5 pm and the GPS readings indicate sunset is 6 pm. Based on the analysis, at 230, the sunset may be a candidate subject that is detected at 240. Based on the analysis, at 230, the sensor data may detect image data regarding the presence of birds using feature detection. Based on the analysis, at 230, a red macaw parrot may be detected as a second candidate subject at 240. If one or more candidate subjects are detected, at 250, then capture actions may be identified at 252.

Further continuing the second example, the capture actions at 252 may utilize the camera attributes received at 210 related to the parrot and the sunset to make one or more adjustments to the camera. The first adjustment may be to make the ISO setting that is common to the parrot and the sunset, such as ISO 450. The second adjustment may be to generate a visual notification to set the aperture setting common to the parrot and the sunset, such as red text on a black background stating "set f-stop to 12." The capture actions at 252 may be identified as setting an alarm for the user to take a picture in forty-five minutes. The capture actions may be performed at 254 by setting the ISO to 450, providing the notification "set f-stop to 12" through a viewfinder of the camera, and playing an alarm sound through a speaker of the camera that audibly states "find a parrot to photograph" after forty-five minutes. The user may react to the alarm performed at 254 by taking a picture of a parrot at sunset. If the parrot at sunset was successfully captured at 260, the profile data related to the user may be updated with the photograph at 270.

Figure 3:
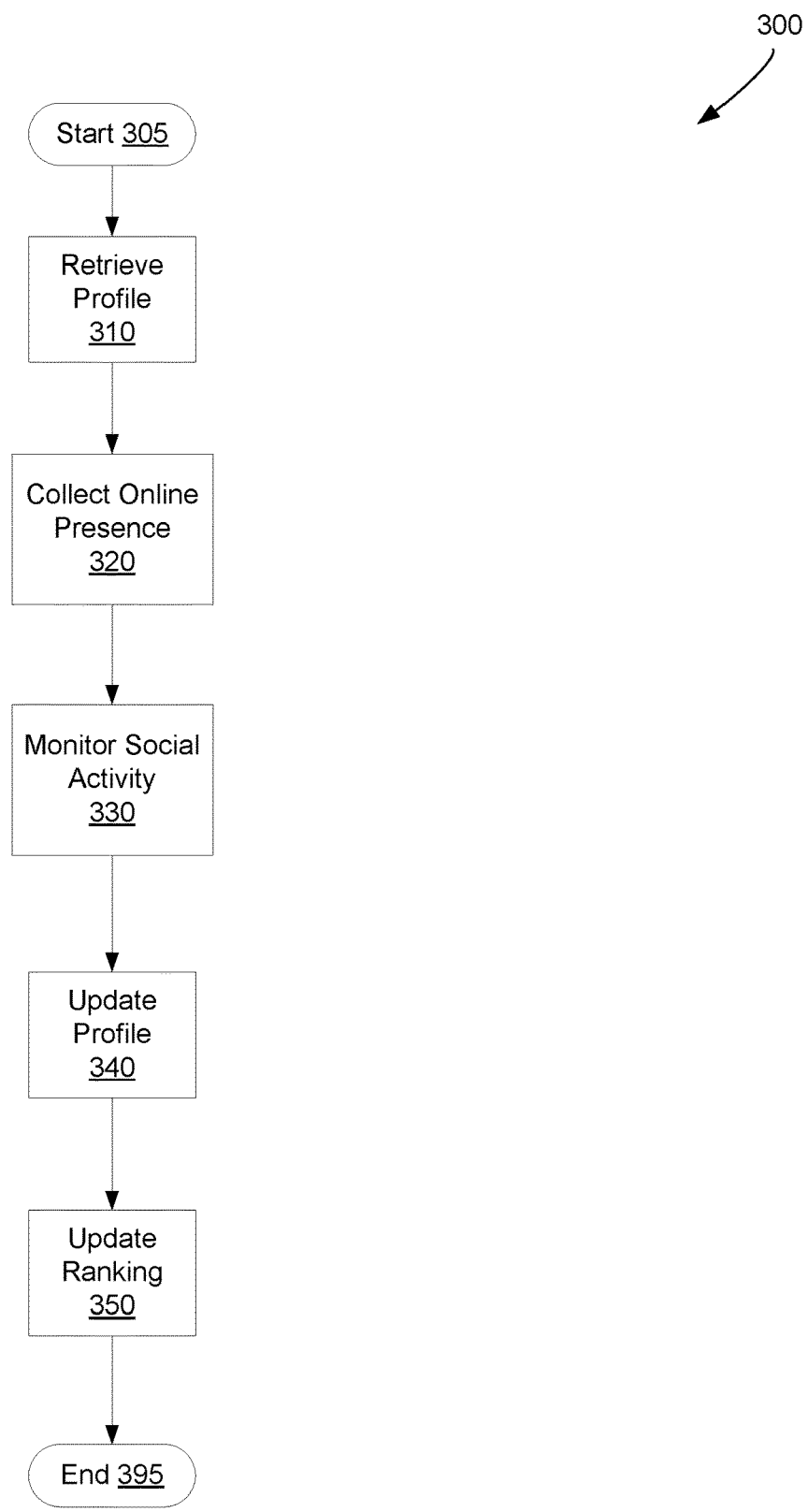
FIG. 3 depicts an example flow diagram of a method for mining the activity and intent of a user of a camera system consistent with embodiments of the present disclosure.

FIG. 3 depicts an example flow diagram of a method 300 for mining the activity and intent of a user of a camera system consistent with embodiments of the present disclosure. Method 300 may be performed by a capture camera in accordance with embodiments of the present disclosure. Method 300 may be performed by a plurality of components of a capture system in accordance with embodiments of the present disclosure. For example, some operations may be performed by one or more servers communicatively coupled to a camera through a network while other operations may be performed by the camera itself. In some embodiments, method 300 may be performed entirely by a server or computer system, such as the computer depicted in FIG. 4. Method 300 may include more or less operations than those depicted and some of depicted and some operations may be combined or separated. One or more operations of method 300 may be executed continuously, or repeated periodically (e.g., every sixteen milliseconds, every ten milliseconds, etc.).

From start 305, a profile related to a user of a camera may be retrieved at 310. The profile may be retrieved at 310 in response to sensing that a user is using the camera, such as the user turning on the power of the camera. The profile may be retrieved at 310 in response to a request received from the camera and sent through a network communicatively coupling the camera. The request may include a request for profile data of the user. In some embodiments, the request may include other attributes such as a request for candidate subjects and/or relevant rankings of subjects.

The profile data, retrieved at 310, may include one or more attributes relating to the history and activity of a user (e.g., historical profile data). The historical profile data may include images, such as photographs. The historical profile data may include metadata related to photos, such as EXIF data. The historical profile data may also include a ranking of candidate subjects and interests of the user. The rankings may be based on quantity, such as how many photographs or online profiles are related to a given subject. For example, if a photograph of a Bulldog was taken more recently than a photograph of an Alsatian but there are more total photos of Alsatians, then the ranking of the quantity may indicate a preference for Alsatians. The rankings may be based on recency, such as how recently was a given candidate subject identified by a photograph or by a social interaction. For example, if a photograph of a Bulldog was taken more recently than a photograph of a brown Alsatian, then the ranking of the recently may indicate a preference for Bulldogs.

The online presence of a user may be collected at 320. The online presence may be collected at 320 based upon the profile data being retrieved at 310. The online presence may include the credentials of any social networking account where the user is a member (e.g., Facebook, Twitter, etc.). The online presence may include any subgroups or sub-memberships of any social networking account of the user. For example, the user may be a member of a subgroup focused on Dalmatians or other specific breed of dogs. Both the membership (e.g., the username and profile associated with the Dalmatian subgroup) and the related candidate subjects (e.g., dogs and dog breed information) by the online presence of the user may be collected at 320. The collection of the online presence at 320 may be performed by natural language processing on the name of the online social network, the title of the group, metadata of photographs posted on the online social network, or textual posts of the online social network. The collection of the online presence at 320 may be performed by feature detection (or other photo analysis) on the online social network, including photographs posted on the online social network.

At 330 the social network activity of the user may be monitored. The monitoring at 330 may occur periodically (e.g., every ten minutes, every few hours, every day, etc.). The monitoring 330 may occur in response to retrieving the profile data at 310. The social activity of the user may include any interactions the user perform while on the social networking websites connected with the user's profile. The interactions may be a user posting a new photograph. The interactions may include a user interacting with another online profile, such as by liking or approving of a second users photos or posts. The interactions may be a user sharing a photo with other users (e.g., sharing a photo they posted in a group related to dogs, sharing a photo posted by someone else on their own social media site, etc.). The monitoring of the social networking activity at 330 may include the performance of natural language processing on text fields and feature detection on photographs. The monitoring of the social networking activity at 330 may include retrieving from online social networks any geographic or sensory data posted by the user or any other users. In a first example, a user checks in to a location at a restaurant for a party with a smartphone. In a second example, a smartphone interacts with an IoT beacon at a dog park to record the presence of the smartphone during a specific time of day.

At 340 one or more updates to the profile may be generated. The updates generated at 340 may be based on the collected online presence at 320. The updates generated at 340 may be based on the social network activity monitored at 330. The profile updates generated at 340 may include inserting one or more entries to data tables related to the profile of the user (e.g., usernames of new social networking accounts joined by the user, the title and description of one or more subgroups the user has joined, etc.). The profile updates generated at 340 may include inserting any results of any performed natural language processing of textual entries and photo metadata or feature detection of photographs. The updates to the profile may be generated based on receiving a new photograph from a camera adjustment system. In a first example, a subject without any profile information associated (i.e., a new subject) has been captured by the camera. Continuing the first example, the newly captured subject will be analyzed for any features related to the subject, such as category that may be created or matches to existing subjects. In a second example, a subject that matches existing profile information has been captured by the camera. Continuing the second example, any information related to the existing subject such as EXIF data may be added. Continuing the second example, the total number of captures of the existing subject may be incremented by one.

The updates to the profile may be generated at 340 based on intent mining. Utilizing data mining, method 300 may enable the analysis of data to determine a trend or intent of the user. The data mining may operate in the form of a recency map that assigns a higher weighting to recent elements of online activity of the user. The recency map may include and operate based on assigning different weights to various elements of the online presence of the user. For example, assigning different weights to a blog entry created by a user, to a like, or a share of other content. The recency map may calculate an intent by combining attributes and their values against the various weights to generate an intent score for each candidate subject discussed, shared, or photographed by the user. The recency map may be one of many mining methods. Machine learning, for example, may be used and may be based on a population of users using aggregated and anonymized data. The recency may be stored in the profile data as part of the updates to the profile that are generated at 340 (e.g., inserting same entries to data tables that are related to the profile of the user). The recency map that stores the mined intent of the user and the actual candidate subjects of the user may be retrieved by a capture camera and may be utilized to determine the presence of a candidate subject as well as identify and perform one or more capture actions.

After generating new profile updates at 340, the profile data associated with rankings of the candidate subjects may be updated at 350. Each of the candidate subjects that are stored in the historical profile data may include an index or ranking value. For example, a first candidate subject contains the following values in a record of historical profile data: type 'nature', subject 'horse', number of images '47', number of social profile entries '321', and ranking '3'. The updating of the candidate subject rankings at 350 may be based on time. For example, a candidate subject may be ranked higher based on time of day, such as near sunset based on a user being a member of a sunset lovers social media sub group. The updating of the candidate subject rankings at 350 may be based on recency. For example, a candidate subject of a goldfish may be ranked higher than another of a friend because more recently another post that contained a picture of a goldfish was taken than a post or photograph of the friend. The updating of the candidate subject rankings at 350 may be based on the total number of photographs captured. For example, a candidate subject of 'child' may have a higher ranking than a candidate subject of 'pet dog' because there are more photographs captured of the child. The updating of the candidate subject rankings at 350 may also be based on the generated and updated recency map that is generated and updated, at 340. The candidate subject rankings, updated at 350, of the user may be retrieved by a capture camera and may be utilized to determine the presence of a candidate subject as well as identify and perform one or more capture actions. After the candidate subject ranking are updated at 350, method 300 may end at 395.

Method 300 may be performed in response to receiving a photograph captured with a camera adjustment system (CAS) consistent with embodiments. At start 305, a photograph of a sunset may be received and the profile data of the user may be retrieved at 310. The profile data may include one or more candidate subjects, such as a dog and the sunset. The profile data may include rankings that rank the dog as higher based on the total number of images and the social activity of the user related to the dog. The dog may have twenty five photographs and thirteen connections on the user's social media. The sunset may have twenty four photographs and thirteen connections on the user's social media. The current ranking may place the dog as second and the sunset as third in overall rankings of candidate subjects. At 320 the online presence of the user may be collected. At 330 the social activity of the user may be monitored and it may be determined that the user has started following a club titled "sunset fans." Using natural language processing and pattern matching at 330 it may be determined that there are now fourteen connections related to sunsets. At 340 various profile updates may be generated that update the number of photographs of sunsets to twenty five photographs and fourteen connections on the user's social media. The rankings of the candidate subjects may be updated at 350 to reflect the ordering of the sunset has surpassed the dog based on the updated photograph count and social media connections. After execution of operation 350 the sunset may be ranked second and the dog may be ranked as third in the overall rankings of candidate subjects. After generating the various updates to the user profile at 340 and the updated ranking at 350, method 300 may end at 395.

Figure 4:
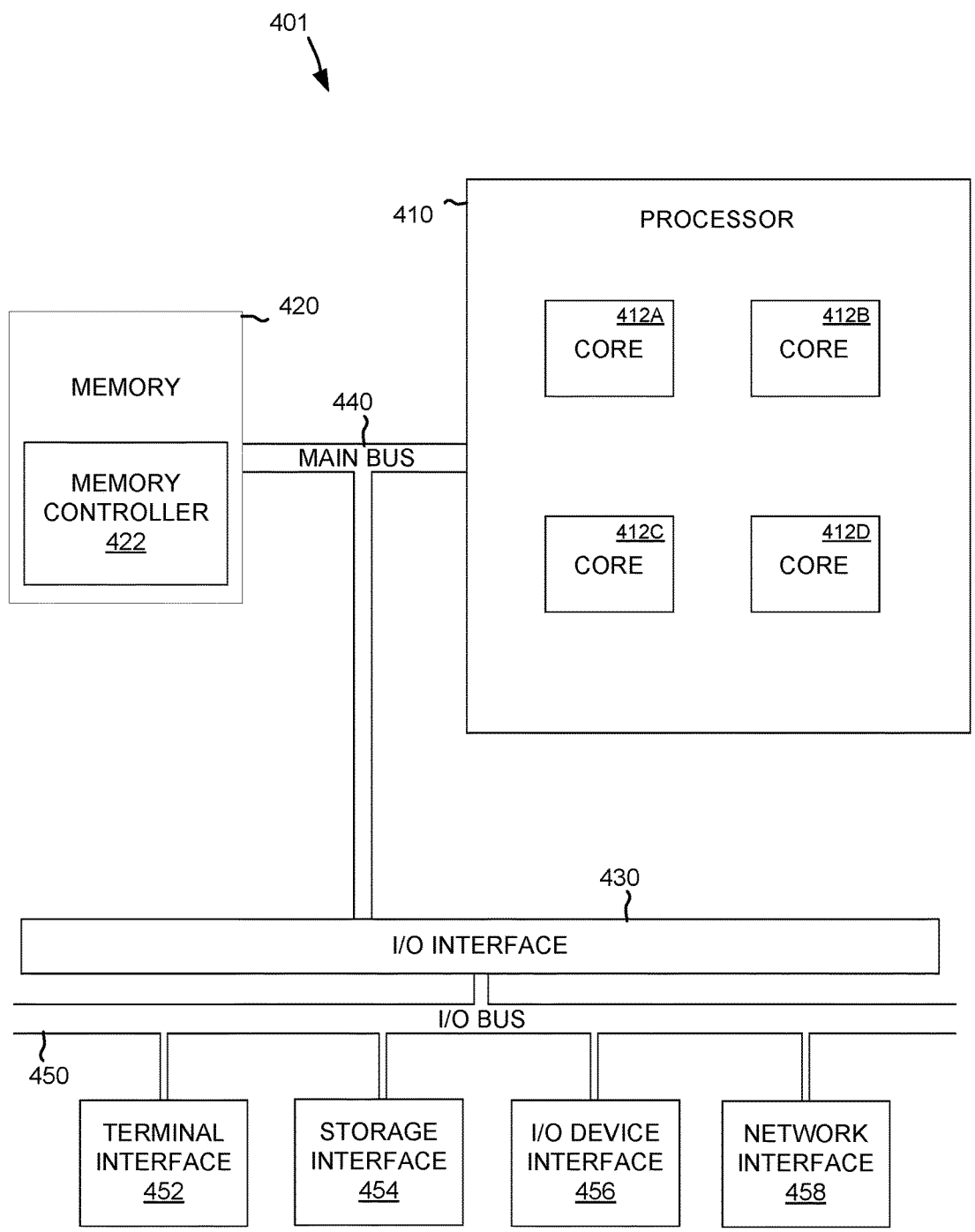
FIG. 4 depicts the representative major components of an example computer system 401 that may be used, in accordance with embodiments of the present disclosure.

FIG. 4 depicts the representative major components of an example computer system 401 that may be used, in accordance with embodiments of the present disclosure. It is appreciated that individual components may vary in complexity, number, type, and\or configuration. The particular examples disclosed are for example purposes only and are not necessarily the only such variations. The computer system 401 may comprise a processor 410, memory 420, an input/output interface (herein I/O or I/O interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or methods consistent with embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of managing camera settings, the method comprising:
    detecting, based on historical profile data related to a user of a camera, a candidate subject for capture by the camera, wherein the historical profile data includes one or more attributes relating to the activity of the user, wherein the historical profile data is mined to form a recency map that assigns a higher weighting to recent activity of the activity of the user;
    identifying, by the camera and based on the detected candidate subject, one or more adjustments of the camera for capture of the candidate subject; and
    performing, by the camera and based on the identified adjustments, a proper capture action, wherein the proper capture action includes adjusting the camera before receiving an input from the user.

2. The method of claim 1, wherein the detecting is further based on a social media profile of the user, and wherein the method further comprises:
    monitoring, by a server, the social media profile of the user; and
    ranking, by the server, a plurality of candidate subjects including the candidate subject based on the monitored social media profile of the user.

3. The method of claim 1, wherein the detecting is performed by a server, and wherein the method further comprises:
    receiving, by the camera, the detected relative position of the candidate subject with respect to the camera.

4. The method of claim 1, wherein the user is a first user, and wherein the historical profile data includes an online relationship of the first user to a second user.

5. The method of claim 1, wherein the historical profile data includes membership in an online community.

6. The method of claim 1, wherein the historical profile data comprises previously taken photos.

7. The method of claim 6, wherein the previously taken photos are stored on the camera.

8. The method of claim 1, wherein the identifying the one or more adjustments includes selecting a white-balance setting, selecting a focus setting, and selecting a zoom setting, and wherein the method further comprises:
    determining, by the camera, a lack of camera resources; and
    removing, by the camera and based on the lack of camera resources, the selected white-balance settings from the identified one or more adjustments.

9. The method of claim 1, wherein the proper capture action includes notifying the user, and wherein the method further comprises:

generating, by the camera, a notification for the user; and
sending, by the camera, the notification to a smartphone of the user, the smartphone configure to provide an audiovisual alert based on the notification.

10. The method of claim 1, wherein the detecting is further based on a network connected device, wherein the method further comprises:

receiving, by the camera and from the network connected device, the candidate subject.

11. The method of claim 10, wherein the network connected device further comprises a second camera, and wherein the candidate subject was determined by the second camera before the detecting.

12. The method of claim 1, wherein the camera includes a global position sensor (GPS) and an orientation sensor, and wherein the detecting is based on a first location reading of the GPS, and wherein the identifying is further based on the orientation sensor, and wherein the identifying further comprises comparing a second reading from the orientation sensor with a first reading from the orientation sensor obtained when the candidate subject was detected, and
wherein the performing the proper capture action further comprises generating an orientation instruction based on the comparison.

13. The method of claim 1, wherein the profile data includes a first ranking of a plurality of candidate subjects including a first candidate subject and a second candidate subject, and wherein the detecting the candidate subject further comprises:

determining the second candidate subject was photographed more recently than the first candidate subject; and
selecting the second candidate subject as the candidate subject for capture by the camera based on the recency determination.

14. A system of managing camera settings, the system comprising:

a memory;
a processor, the processor in communication with the memory, the processor configured to perform the following:
 detect, based on historical profile data related to a user of a camera, a candidate subject for capture by the camera, wherein the historical profile data includes one or more attributes relating to the activity of the user, wherein the historical profile data is mined to form a recency map that assigns a higher weighting to recent activity of the activity of the user;
 identify, based on the detected candidate subject, one or more adjustments of the camera for capture of the candidate subject; and
 perform, based on the identified adjustments, a proper capture action, wherein the proper capture action includes adjusting the camera before receiving an input from the user.

15. The system of claim 14 further comprising a network connected device, wherein the detecting is further based on the network connected device, the processor further configured to perform the following:

receive, by the camera and from the network connected device, the candidate subject.

16. The system of claim 15, wherein the network connected device further comprises a second camera, and wherein the candidate subject was determined by the second camera before the detecting.

17. A computer program product comprising a computer readable storage medium having program instructions embodied therewith, the program instructions executable by a computer to manage camera settings, the program instructions executable to perform a method comprising:

detecting, based on historical profile data related to a user of a camera, a candidate subject for capture by the camera, wherein the historical profile data includes one or more attributes relating to the activity of the user, wherein the historical profile data is mined to form a recency map that assigns a higher weighting to recent activity of the activity of the user;
identifying, by the camera and based on the detected candidate subject, one or more adjustments of the camera for capture of the candidate subject; and
performing, by the camera and based on the identified adjustments, a proper capture action, wherein the proper capture action includes adjusting the camera before receiving an input from the user.

18. The computer program product of claim 17, wherein the detecting is further based on a social media profile of the user, and wherein the method further comprises:

monitoring, by a server, the social media profile of the user; and
ranking, by the server, a plurality of candidate subjects including the candidate subject based on the monitored social media profile of the user.

19. The computer program product of claim 17, wherein the user is a first user, and wherein the historical profile data includes an online relationship of the first user to a second user.

20. The computer program product of claim 17, wherein the identifying the one or more adjustments includes selecting a white-balance setting, selecting a focus setting, and selecting a zoom setting, and wherein the method further comprises:

determining, by the camera, a lack of camera resources; and
removing, by the camera and based on the lack of camera resources, the selected white-balance settings from the identified one or more adjustments.

* * * * *